United States Patent Office 3,505,794
Patented Apr. 14, 1970

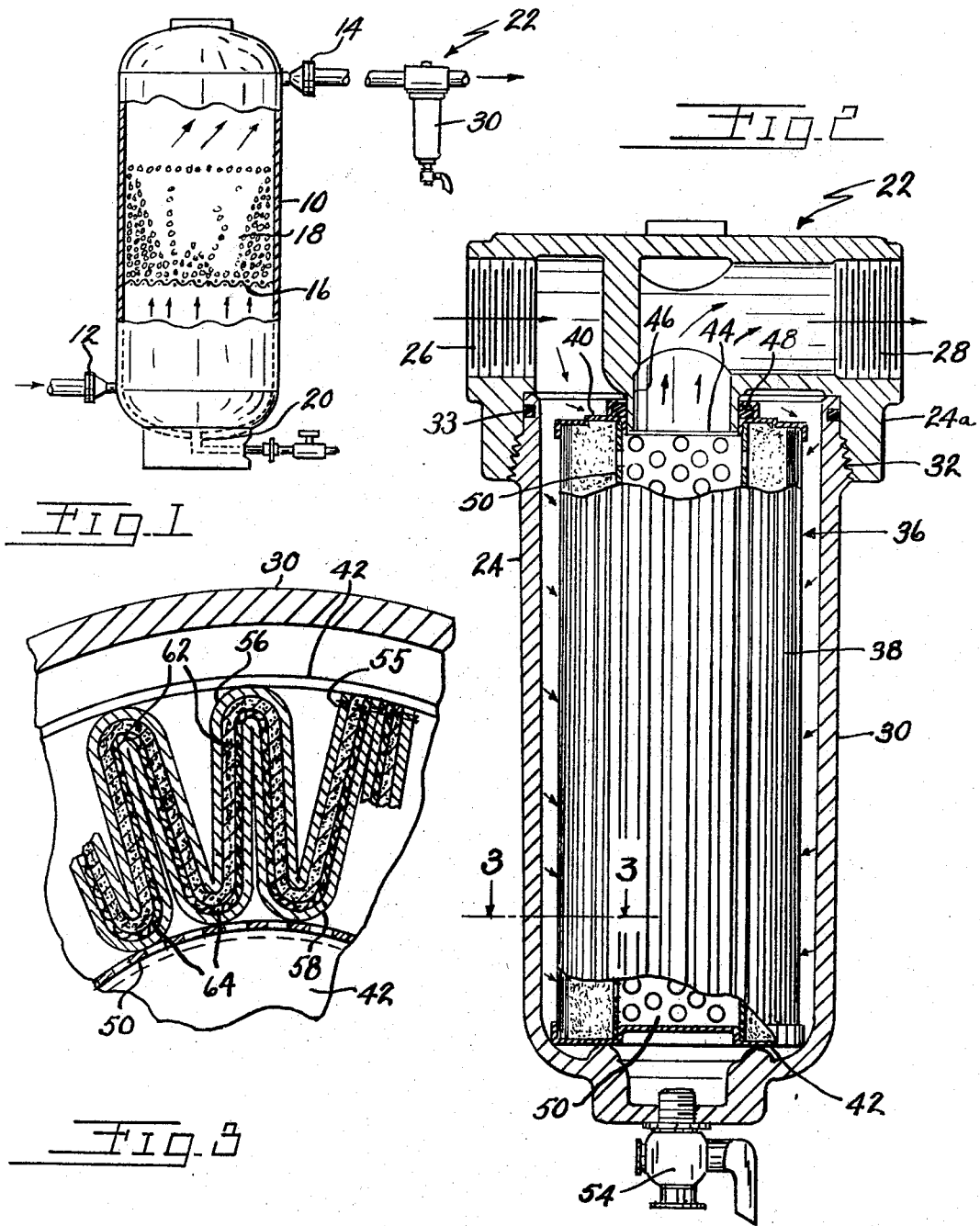

3,505,794
AIR FILTER
Raymond W. Nutter, Fairview, and Frederick M. Sitter, Erie, Pa., assignors to Van-Air Incorporated, a corporation of Pennsylvania
Filed May 29, 1968, Ser. No. 732,996
Int. Cl. B01d 53/16, 50/00
U.S. Cl. 55—487                                     11 Claims

ABSTRACT OF THE DISCLOSURE

A filter adapted for removing hydrocarbons and other contaminants from pressurized air and adapted to be disposed in the air line, and comprising a housing having an inlet and an outlet and a replaceable microporous cartridge disposed in the housing in the air flow between the inlet and the outlet, for filtering out the hydrocarbons and other contaminants, said replaceable cartridge comprising a pleated composite sleeve-like member adapted to pass air therethrough after which the air is adapted to pass through the outlet of the housing, and wherein the pleated composite filter member comprises an outer filter layer of fibrous material, a fibrous sheet layer having activated carbon particles therein, a backup filter layer of a relatively small porosity as compared to the porosity of the carbon impregnated sheet, and a further layer of fibrous material.

---

This invention relates in general to an air filter and more particularly to a replaceable type air filter cartridge formed of a plurality of layers of filtering material for removing hydrocarbons and other contaminants from the air stream.

It is known in the art to use cartridge type filters having a bed of activated carbon for removing hydrocarbons in the form of oil droplets and mists, and other contaminants from a pressurized air stream. An example of such prior art is U.S. Patent 3,252,270, issued May 24, 1966 to D. B. Pall et al. However, the effectiveness of such air filters generally leaves much to be desired in that the conventionally embodied beds of sorbents for removing the entrained vapors and droplets from the air stream generally results in a material pressure drop in the air being treated as it passes through the filter mechanism. Moreover particles of the sorbents, such as activated carbon particles from the filter bed, are sometimes picked up by the air stream and carried along therewith.

Accordingly, an object of the present invention is to provide a novel air filter mechanism for removing hydrocarbons and other contaminants and which minimizes the pressure drop in the air flow.

Another object of the invention is to provide a filter mechanism of the above type including a plurality of layers of microporous filter material through which the air flow is adapted to pass and with a layer of carbon filled sheet material interleaved with the other layers of microporous material.

A further object of the invention is to provide a filter of the above discussed type wherein the layers of microporous material comprise an outer paper layer of between approximately 10 to 40 microns nominal particle efficiency or porosity and an intermediate fiber glass layer of between approximately .2 to 2 microns nominal particle efficiency or porosity, and an inner paper layer of between approximately 10 to 40 microns nominal particle efficiency or porosity, with at least one sheet of carbon filled material being disposed between the intermediate layer and the outer layer of material and having a nominal porosity of between approximately 15–35 microns.

A still further object of the invention is to provide an air filter adapted for use in conjunction with a deliquescent-type of air dryer mechanism downstream from the air dryer mechanism, and which is especially adapted for removing hydrocarbons from the air flow.

Further objects and advantages of the invention will be apparent from the following description taken in conjunction with the accompanying drawings wherein:

FIGURE 1 is a generally diagrammatic, side elevational partially broken, illustration of an air filter of the type of the invention disposed in line with a deliquescent-type air dryer, downstream from the latter.

FIGURE 2 is an enlarged sectional illustration of the filter mechanism of FIGURE 1 and showing the replaceable composite cartridge which provides the depth filtration of the air.

FIGURE 3 is an enlarged fragmentary sectional view taken generally along the plane of line 3—3 of FIGURE 2 looking in the direction of the arrows.

Referring now again to the drawings, there is disclosed a gas or air dryer of the deliquescent desiccant type comprising an enclosure or tank 10 having an air inlet 12 through which pressurized inlet air from an air compressor or the like, enters the dryer to be dried. After passing through the dryer, the air with the moisture removed therefrom passes out the outlet 14. It will be understood that the term air as used herein also includes gas. Disposed intermediate the inlet 12 and the outlet 14 may be an air pervious supporting means 16, such as a grid or screen, on which is disposed a bed 18 of deliquescent desiccant. The deliquescent desiccant is a chemical composition preferably in particle form adapted to attract moisture from the air as the latter engages the bed and passes therethrough. Such attracted moisture causes dissolving of the desiccant material in the bed, such liquid dropping or flowing down through the bed to the bottom of the dryer enclosure where it is adapted to be removed through the drain opening 20 in the dryer enclosure. Drain opening 20 may be coupled to a drain line or to a sewer system or any other suitable disposal area for disposing of the drain solution. The air or gas entering the dryer is under pressure of preferably approximately 150 p.s.i.g. (although the filter may be used with pressures within a range of approximately 30 p.s.i.g. to 5000 p.s.i.g.) and passes through the desiccant bed 18 and out the outlet 14 as dry air. Reference may be had to U.S. Patent No. 3,246,453, issued Apr. 19, 1966 in the name of Philip S. Becker for a more complete disclosure of a deliquescent desiccant gas dryer of the general above-discussed type.

An air filter apparatus generally designated by reference number 22 may be provided in exit line 24 for removing contaminants such as hydrocarbons from the pressurized air flowing in exit line 24, for obtaining oil-free compressed air.

Filter 22 may comprise a housing 24 having a head portion 24a wherein there is located an inlet port 26 and an exit port 28, and a removable body portion 30 attached as by threads 32 to the head portion. Sealing means 33 may be provided for sealing body portion 30 to the head portion. Disposed in the housing is a replaceable cartridge-type filter 36 which includes a body of pleated or corrugated permeable layers of filter materials disposed intermediate upper and lower caps 40, 42. Cap 42 extends completely across the filter body which is in cylindrical-like sleeve form, while upper cap 40 has an opening 44 therethrough which communicates the interior of the cartridge with the exit port 28 when the cartridge is disposed in assembled relation in the housing 30. As can be seen, the exit port 28 communicates as by means of a circular boss 46 with opening 44 and with the upper cap 40 preferably having a sealing means, such as an O-ring 48 which coacts with the circular boss 46 to seal the cartridge with respect to the boss, thus insuring that air that has passed from the exterior of the cartridge through the walls thereof into the interior passageway will not leak back out. The interior passageway may be defined by a perforated sleeve or tube 50 made of any suitable material, such as metal, and which is disposed in attached relationship at its lower end with the lower cap 42, and which coacts at its upper end with the opening 44 in the upper cap 40.

The lower end of the filter housing 30 may have a drain cock 54 thereon for removing any collected moisture or for permitting egress of air from the housing. Of course, if the filter mechanism is utilized in conjunction with a gas dryer 10, the air coming into the filter will be dry and ordinarily no moisture will be condensed out for removal by drain cock 54.

As aforementioned, the body 38 of the cartridge is preferably disposed in corrugated or pleated form presenting a series of circumferentially distributed pleats extending in side by side relation substantially co-extensive with the cylindrical cartridge, and a best shown in FIGURE 3. The various layers of filter materials are preferably originally disposed in linear interleaved relationship and then are subsequently pleated and then sewn as at 55 (FIG. 3) along the confronting ends thereof, to maintain the cylindrical sleeve-like configuration of the cartridge.

The outer layer 56 of cartridge body 38 may be comprised of a fibrous filter element paper formed of various fibers and/or admixtures of fibers. A suitable paper may be formed of a non-woven mat of cellulose and/or synthetic fibers which may or may not have binders included therewith. However, if such a binder is used with the fibers, the binder may be composed of a phenolic resin. Outer layer 56 could also comprise a membrane type element such as for instance a non-woven acetate type membrane, produced for instance by the Millipore Company Inc. of Bedford, Mass. The filter element 56 may have a porosity of nominal particle efficiency in the range of between approximately 10 to 40 microns and may be of approximately $.026 \pm .010$ inch in gauge or thickness. The innermost filter lay 58 may be generally similar to that of the outermost layer 56, or in other words, possessing a nominal particle efficiency in a range of between approximately 10 to 40 microns and a sheet gauge or thickness of approximately $.026 \pm .010$ inch.

Disposed adjacent the outer sheet 56 is a porous carbon filled filter sheet 62 which consists essentially of a substantially homogenous mixture of fibers and activated carbon particles firmly retained or bonded to the fibers, with the activated carbon particles being present in an amount of at least 30% by weight of the sheet and with the sheet containing a cationic starch and being characterized by substantial freedom from flaking, smudging and rub-off. Such carbon filter sheet may have a porosity or nominal particle efficiency in the range of approximately 15 to 35 microns and a thicknness or gauge of approximately $0.045 \pm .009$ inch. The carbon filter layer 62 of the filter is especially effective to remove hydrocarbons and the like from the air flow through the filter cartridge. U.S. Patent 3,149,023 issued Sept. 15, 1964 discloses a suitable type of carbon filled sheet and the method of production therefor.

A backup filter element or layer 64 is provided between the carbon filter layer 62 and the inner filter layer 58 with such backup filter element having a porosity or nominal particle efficiency in the range of approximately 0.2 to 2 microns, and a gauge or thickness of approximately $0.015 \pm .005$ inch. Layer 64 may be conveniently formed of a non-woven mat composed of fiberglass impregnated with a acrylic binder. This type of sheet requires no cure medium.

The following is a specific example of a cartridge body construction which has proven to be highly satisfactory:

The outer paper layer 56 and inner paper layer 58 each having a nominal particle efficiency rating of approximately 10 microns and a thickness or gauge of approximately $0.026 \pm .010$ inch; a basis weight of approximately 100–105 pounds; a tensile strength of approximately 30 pounds in the machine direction and approximately 12 pounds in the cross direction; and a Frazier permeability of approximately 8–10 c.f.m. per ft.$^2$.

The carbon filled layer 62 which may be identified as C. H. Dexter Grade X 1230 Activated Carbon Paper produced by the C. H. Dexter & Sons Company of Windsor Locks, Conn. and having a nominal particle efficiency rating of approximately 25 microns and a thickness or gauge of approximately $0.045 \pm .009$ inch; a basis weight of approximately 150 pounds $\pm 20$ pounds; a tensile strength of approximately 11.5 pounds in the machine direction and approximately 8.5 pounds in the cross direction; a Gurley permeability of approximately 20 c.f.m. per ft.$^2$; and a carbon content of approximately 50% by weight.

The intermediate backup filter layer 64 having a nominal particle efficiency rating of approximately 0.3 microns and a thickness or gauge of approximately $0.015 \pm 0.005$ inch; a basis weight of approximately 40 pounds; a tensile strength of approximately 3.6 pounds in the machine direction and approximately 2.8 pounds in the cross direction; a Frazier permeability of approximately 3.5 c.f.m. per ft.$^2$; and DOP penetration of approximately .001% at 10.5 ft./min. approximately .002% at 28 ft./min.

It will be noted that the back-up sheet 64 has the smallest porosity or particle efficiency rating and effectively prevents the passage of minute particles such as carbon particles therethrough, into the air stream.

The above identified specific example of cartridge produces a pressure drop of approximately 1% maximum across the cartridge at an inlet pressure of 150 p.s.i. at inlet 26, thus giving a filter which does not result in the relatively high pressure drop characteristics of the prior art bet-type activated carbon filters. A filter cartridge of the above identified specific example type of filter with a total cartridge weight of 5 oz. including the weight of the end caps 40, 42 and the center tube 50, was able to absorb 32% of its own weight of hydrocarbons and still work effectively before needing replacement because of increased pressure drop.

The length of the pleated cartridge as well as the depth and number of corrugations or pleats will depend on actual service requirements. However, such a replaceable composite filter cartridge provides for easy maintenance with increased filterability and reduced pressure drop as compared to bed-type filters using sorbents such as activated carbon, for removal of hydrocarbons.

From the foregoing discussion and accompanying drawings it will be seen that the invention provides a novel air filter for filtering impurities and particularly hydrocarbons from pressurized air and gas and wherein the filter mehanism includes a pleated disposable cartridge adapted for positioning in a housing for causing presurized air to pass through the cartridge for removing hydrocarbons and other contaminants from the pressurized air or gas flow, and wherein the pleated disposable cartridge comprises a plurality of filter element layers of varying porosity interleaved into which is a porous carbon filled filter element layer composed of a homogeneous mixture of fibers and activated carbon particles firmly attached or retained to the fibers, and with such filter cartridge resulting in minimal pressure drop across the cartridge.

We claim:
1. A filter for removing hydrocarbons and the like from compressed air comprising a housing having an inlet and outlet spaced from said inlet for control of compressed air therethrough, a replaceable filter cartridge in said housing across said outlet, said cartridge comprising a wall disposed across a line of air flow between said inlet and said outlet so that the air has to flow through said cartridge wall, said cartridge wall comprising a plurality of air previous sheet layers of micro-porous fibrous filter material and a micro-porous fibrous air pervious sheet layer having activated carbon particles retained to the fibers of the last mentioned sheet layer, said carbon sheet layer being disposed intermediate the first mentioned sheet layers, said sheet layers being formed into an integral pleated configuration of cartridge wall with said sheet layers in generally juxtaposed condition, said first mentioned sheet layers comprising a first filter layer of paper sheet having an average porosity within a range of approximately 10 to 40 microns, a second filter layer having an average porosity within a range of approximately 0.2 to 2 microns, and a third filter layer of paper sheet having an average porosity within a range of approximately 10 to 40 microns, said carbon sheet layer being disposed intermediate said first and second filter layers and having an average porosity within a range of approximately 15 to 35 microns with approximately 30% to 75% of the weight of said carbon sheet layer consisting of said activated carbon particles.

2. A filter in accordance with claim 1 wherein said first filter layer of paper sheet has an average porosity of approximately 10 microns, said second filter layer has an average porosity of approximately .3 micron and is formed of fiber glass, said third filter layer of paper sheet has an average porosity of approximately 10 microns, and said carbon sheet layer has an average porosity of approximately 25 microns.

3. A filter in accordance with claim 1, wherein said plurality of sheet layers of micro-porous filter material and said carbon sheet layer are oriented into a cylindrical tube-like configuration having a series of circumferentially distributed pleats extending in generally side-by-side relation lengthwise of said tube-like configuration.

4. A filter in accordance with claim 1, wherein said first layer and said third layer are each of a gauge of approximately 0.026±0.010 inch and said second layer is of a gauge of approximately 0.015±0.005 inch, and said carbon sheet layer is of a gauge of approximately 0.045±0.009 inch.

5. A filter in accordance with claim 1, wherein said second layer of microporous material comprises a nonwoven micro-fiber fiber glass mat impregnated with a binder.

6. A filter in accordance with claim 1, wherein said first and third layers of paper sheet each comprises a fibrous nonwoven cellulose and synthetic fiber mat impregnated with a resin.

7. A filter in accordance with claim 1, wherein said second layer is comprised of a nonwoven mat of microfibrous fiber glass impregnated with an acrylic binder, and having thickness of approximately 0.015±0.005 inch.

8. A filter in accordance with claim 1, wherein approximately 50% of the weight of said sorbent cotton sheet layer consists of said activated carbon.

9. In a replaceable filter cartridge comprising a wall portion adapted for disposable across a line of compressed air flow between an inlet and an outlet of a housing so that the air has to flow through the cartridge wall portion, said cartridge being adapted for removing hydrocarbons and the like from the air flow, said cartridge wall portion comprising a plurality of air pervious sheet layers of micro-porous fibrous filter material and a micro-porous fibrous air pervious sheet layer having activated carbon particles retained to the fibers of the last mentioned sheet layer, said carbon sheet layer being disposed intermediate the first mentioned sheet layers, said sheet layers being formed into an integral pleated configuration with said sheet layers disposed in generally juxtaposed condition, said first mentioned sheet layers comprising a first filter layer of paper sheet having an average porosity within a range of approximately 10 to 40 microns, a second filter layer having an average porosity within a range of approximately 0.2 to 2 microns, and a third filter layer of paper sheet having an average porosity within a range of approximately 10 to 40 microns, said carbon sheet layer being disposed intermediate said first and second filter layers and having an average porosity within a range of approximately 15 to 35 microns with approximately 30% to 75% of the weight of sad carbon sheet layer consisting of said activated carbon particles.

10. A filter cartridge in accordance with claim 9 wherein said cartridge provides a cylindrical pleated tube-like configuration having a series of circumferentially distributed pleats extending in generally side-by-side relation lengthwise of the cartridge, end cap members on said cartridge, one cap member being imperforate and encompassing one end of said cartridge in sealing relation the other cap member having opening means therein for communicating the interior of the cartridge with air flow, and sealing means on said other cap member coacting with said opening means and adapted for sealing coaction with the housing in which said cartridge is adapted to be received.

11. A filter cartridge in accordance with claim 10 wherein said second layer is a nonwoven mat of microfibrous fiber glass impregnated with a binder, and having a thickness of approximately 0.015±0.005 inch, and said first and said third layers of paper sheet each comprises a fibrous nonwoven cellulose mat having a thickness of approximately 0.026±0.010 inch, and wherein approximately 50% of the weight of said carbon sheet layer consists of said carbon particles, said carbon sheet layer being of a gauge of approximately 0.045±0.009 inch.

References Cited

UNITED STATES PATENTS

| | | | |
|---|---|---|---|
| 2,675,127 | 4/1954 | Layte | 210—493 |
| 2,801,751 | 8/1957 | Thomas | 210—493 |
| 2,826,265 | 3/1958 | De Woody | 210—505 |
| 3,015,367 | 1/1962 | Smith et al. | 55—524 |
| 3,115,459 | 12/1963 | Giesse | 210—493 |
| 3,196,871 | 7/1965 | Hormats et al. | 55—524 |
| 3,198,334 | 8/1965 | Brucken et al. | 210—493 |
| 3,201,927 | 8/1965 | Wachter | 55—521 |
| 3,217,470 | 11/1965 | Omohundro | 55—498 |
| 3,246,453 | 4/1966 | Becker | 55—388 |
| 3,252,270 | 5/1966 | Pall et al. | 210—505 |
| 3,258,900 | 7/1966 | Harms | 210—493 |
| 3,260,370 | 7/1966 | Schwartzwalder | 210—492 |
| 3,353,682 | 11/1967 | Pall et al. | 210—505 |

HARRY B. THORNTON, Primary Examiner

B. NOZICK, Assistant Examiner

U.S. Cl. X.R.

55—498, 502, 521, 524, 527, 528